United States Patent [19]

Johne

[11] Patent Number: 4,714,389

[45] Date of Patent: Dec. 22, 1987

[54] TOOL HOLDER

[75] Inventor: Frank Johne, Lohne, Fed. Rep. of Germany

[73] Assignee: J. Kuhn GmbH Co., Dorsten, Fed. Rep. of Germany

[21] Appl. No.: 924,846

[22] PCT Filed: Feb. 5, 1986

[86] PCT No.: PCT/DE86/00036

§ 371 Date: Oct. 14, 1986

§ 102(e) Date: Oct. 14, 1986

[87] PCT Pub. No.: WO86/04842

PCT Pub. Date: Aug. 28, 1986

[30] Foreign Application Priority Data

Feb. 13, 1985 [DE] Fed. Rep. of Germany ....... 3504905

[51] Int. Cl.4 .............................................. B23C 5/26
[52] U.S. Cl. ................................ 409/233; 279/1 TS; 408/240
[58] Field of Search ............... 409/230, 231, 232, 233, 409/234; 279/1 A, 1 TS; 408/239, 239 A, 240

[56] References Cited

U.S. PATENT DOCUMENTS 3,554,080 1/1971 Herrmann ........................... 409/234

FOREIGN PATENT DOCUMENTS

| 1900080 | 7/1969 | Fed. Rep. of Germany . |
| 2750367 | 5/1978 | Fed. Rep. of Germany . |
| 56-33207 | 3/1981 | Japan ..................... 409/233 |
| 419860 | 11/1934 | United Kingdom . |
| 1160769 | 8/1969 | United Kingdom . |
| 403514 | 3/1974 | U.S.S.R. .......................... 279/1 TS |
| 544520 | 2/1977 | U.S.S.R. .......................... 409/232 |
| 553058 | 5/1977 | U.S.S.R. .......................... 409/231 |

Primary Examiner—Z. R. Bilinsky
Attorney, Agent, or Firm—Holman & Stern

[57] ABSTRACT

A tool holder (1) which can be inserted into the main spindle of a machine-tool is provided on the front region of its shank portion (2) with a cylindrical guide portion (11) for a tapered ring (12) which can be braced elastically and on the rear region of the shank portion (2) there is provided a second cylindrical guide portion (12) for a second tapered ring (14) which can also be braced elastically. At least one of the tapered rings (13, 14) is advantageously provided with a longitudinal slot or partial slots. A flange portion (3) is provided on the front portion which is applied against the front end face (27) of the main spindle (5).

9 Claims, 6 Drawing Figures

TOOL HOLDER

CROSS REFERENCE TO RELATED APPLICATION(S)

This United States application stems from PCT International Application No. PCT/DE86/0036 filed Feb. 5, 1986.

BACKGROUND OF THE INVENTION

Field of the Invention

The invention relates to a tool holder or the like of the type supported in the spindle of a machine tool.

Description of the Prior Art

A tool holder in the form of a cutter arbor, is known (German Pat. No. 1,900,080, which corresponds to U.S. Pat. No. 3,554,080), in which a main member located behind a seat for a conical sleeve is designed as a shank which is continuously cylindrical as far as its end. This shank extends into a cylindrical bored portion of the main spindle, which portion adjoins the tapered receiving part of the spindle at the rear. This cylindrical bored portion is less precisely machined than the tapered receiving part and is not intended to perform any centering or guiding functions with respect to the cutter arbor.

Such a cutter arbor, on account of the cylindrical shank, requires that the design of the spindle be correspondingly adapted, with a cylindrical bored portion behind the tapered receiving part. Compared to a conical body, the cylindrical shank of the arbor ensures less rigidity. Since in practice only one limited area of the arbor cutter can be firmly clamped, namely the part located at the transition point from the shank to the flange, while the end of the cylindrical shank is not intended to be centered or guided particularly, sufficient true rotation cannot be ensured.

BRIEF SUMMARY OF THE INVENTION

The object of the invention is to overcome the existing disadvantages and inadequacies and to provide a tool holder or the like of the type mentioned in the introduction, in which the connection between the shank portion and the main spindle has a greater degree of rigidity compared to the previously known design described and in which at the same time there is greater true rotation, the shank portion itself, moreover, not being subject to any notable loss of rigidity compared to otherwise conventional tool holders.

A further object is to achieve an especially efficient application of the flange portion against the front end face of a main spindle. Nevertheless, the tool holder must be as universally adaptable as possible, i.e. must not require a specially constructed main spindle, as is the case with the known design, but must be suitable for use with different cone systems or clamping systems, e.g. standardized designs of cones, either with or without end journals, and in particular it must also be suitable for use in machines with an automatic tool-changing system. Further objects of the invention will become apparent from the respective description of the invention and solutions of problems as illustrated.

According to the invention, a tool holder of the type mentioned in the introduction has, in the rear region of the shank portion, a second cylindrical guide for a second tapered ring which can be braced against an additional elastic bearing.

Such a tool holder is distinguished by a number of advantageous properties. The main member, at two points on the tapered receiving bore of the main spindle, is subject to a firm and precise clamping action in the region of its largest and smallest diameter, thereby ensuring a high degree of rigidity of the connection between the shank portion and the main spindle. The susceptibility to vibrations and the risk of chatter are reduced considerably. Since one tapered ring can be displaced or adjusted independently of the other one, this is achieved with a greater degree of reliability, it also being possible to compensate for tolerances or errors in the angle of taper of the receiving part of the main spindle. The required application of the flange of the tool holder against the front end face of the main spindle is ensured. Nevertheless, a high degree of true rotation is also achieved. The shank portion may be given the same dimensions as those found in conventional tools and therefore itself also has a high degree of rigidity.

Moreover, the stated tool holder is suitable for the most varied types of applications. It does not require a specially designed main spindle. On the contrary, it can be easily constructed in such a way that it can be used for the currently existing cones, clamping systems and tool-changing devices. It merely requires, like all other tools, a suitably designed clamping means or the like.

The term "tool holder" embraces, within the scope of the invention, all components which are used for performing machining operations and for this purpose are detachably fixed in a main spindle. In particular, such a component may be a so-called main receiving member which is equipped with a tool, a tool carrier, an extension or other part, or it may also be a standard tool.

In particular, so-called O-rings or similar components acting as annular springs may be provided as elastic bearings. However, members or arrangements of another kind, which perform the same function, may also be taken into consideration.

A special tool holder design consists in that at least one of the two tapered rings has a slit. Depending on the circumstances, it may be advantageous if both the tapered rings have slits. By correspondingly dimensioning a cylindrical guiding surface on the shank portion and the internal surface of the tapered ring, it is possible to push the tapered ring up onto the shank portion so that it is slightly prestressed. Hence, it is possible to ensure that there is no play from the front inwards. On the other hand, the conditions may also be such that, when the tool holder is clamped in the receiving part of the main spindle, the relevant tapered ring is compressed to a certain extent and as a result any previously existing play is eliminated.

The slit design may be effected in different ways. There may be a continuous slit from one edge to the other edge of the tapered ring. Furthermore, several non-continuous slits may be provided in particular in such a way that a corresponding number of slits extends alternately from either side and is distributed over the circumference.

According to an additional feature of the invention, an external thread is provided on at least one of the guides or receiving surfaces for a tapered ring, in particular on the guide or receiving surface in the front region of the shank portion, the associated tapered ring having a corresponding internal thread. With the aid of such a thread, it is possible to adjust the tapered ring. In many cases a very small adjustment path is sufficient. As a result, particularly in unfavourable circumstances, it is possible to achieve a precise adjustment according to the respective conditions, for example if, inside the tapered receiving bore of the main spindle, the limit of the tolerance permitted by the norms is reached or even exceeded. It is always possible to achieve fine adjustment between fixing of the shank portion inside the main spindle and flat application of the flange portion against the end face of the said spindle. The embodiment described is, moreover, among other things, of particular importance when there are intense stresses or forces in the radial direction, for example in the case of milling operations which use a mounted tool.

The possibility of adjusting a tapered ring by means of a thread is of importance primarily for the front tapered ring, the rear tapered ring being advantageously freely displaceable on its cylindrical guiding surface, i.e. without a thread. There may, however, also be cases where it is advantageous to provide an adjusting thread for both tapered rings. This also falls within the scope of the invention.

It may be sufficient to provide, in addition to the thread, a single cylindrical guiding surface. Advantageously, however, a cylindrical guiding surface is provided in each case both in front of and behind the external thread of the shank portion, on the latter, the tapered ring having corresponding cylindrical internal surfaces. As a result, the tapered ring is precisely guided in front of and behind the thread. The guiding surfaces have varying diameters, with the result that a stepped arrangement is produced.

The elastic bearing, for example an O-ring, can at the same time serve to prevent twisting in the case of a tapered ring provided with a thread. The arrangement is advantageously effected such that the bearing is subjected to a pressure load in the entire screwing region defined by the thread, as a result of the tapered ring bearing against it with its end face. In this case as elsewhere also, the remaining dimensions are chosen such that, within the resilient path of the bearing, the desired firm bearing pressure both inside the tapered receiving bore of the main spindle and against its end face is achieved.

Where the flange portion of the tool holder is applied at the rear against the front end face of a main spindle, metal-to-metal contact may usually exist, either over an entire surface or in particular in one annular bearing area lying radially outside. Where there are large transverse and flexual forces, it may be expedient to make the bearing surface or its external diameter the same as the diameter of the main spindle, with which the tool holder is to be used.

According to an additional feature, which is also important in its own right, the flange portion of the tool holder is provided at least partially with a vibration-damping lining. This may, among other things, be advantageous when performing boring operations where, although there are relatively small forces, there is the risk of chatter vibrations, which must be dampened or eliminated.

Various materials may be used for the lining. Preferably the lining consists of plastic, for example hard PVC or PTFE or a plastic based on PTFE. In particular it may be a material such as that used for machine-tool guideways.

By selecting or adjusting the material and determining its dimensions, it is possible to make adjustments in accordance with the particular requirements. Hence, it is not difficult, for example, to provide a lining which is suitable for damping medium-frequency vibrations in the important range from 500 to 1,000 Hz.

BRIEF DESCRIPTION OF THE DRAWINGS

Further details, features and advantages of the invention will appear from the following description of exemplary embodiments with reference to the accompanying drawings wherein.

DETAILED DESCRIPTION

Figure 1:
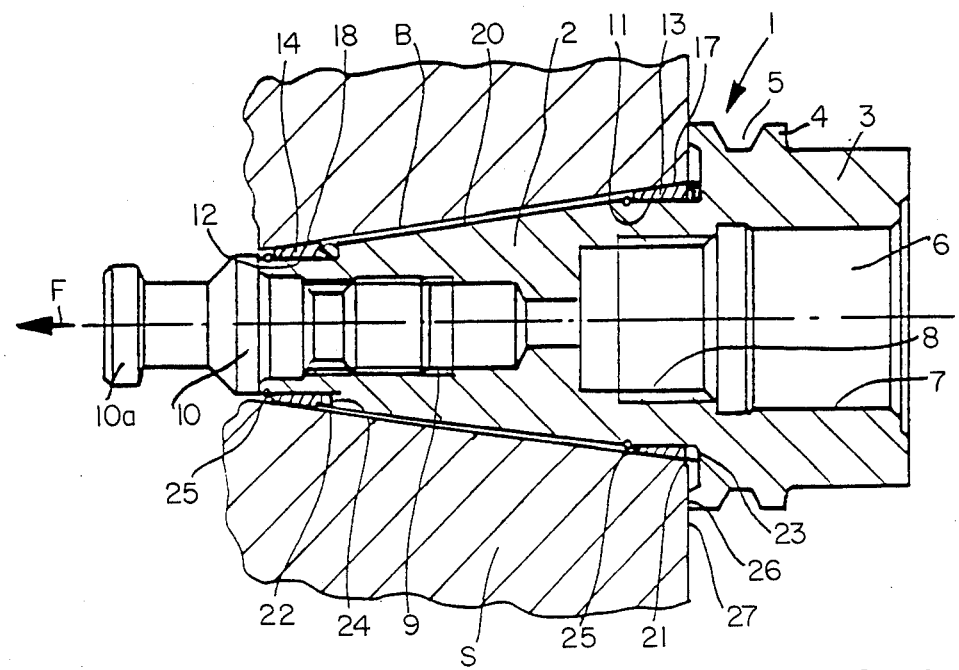
FIG. 1 is an axial longitudinal cross-sectional view of a tool holder of the invention in the front part of a main spindle.

FIG. 1 shows a tool holder, in the form of a so-called main receiving member 1, in a position where it is inserted into the tapered receiving bore B of a main spindle S of a machine tool, for example a horizontal boring machine, a machining center or the like. The tool holder is suitable for use with an automatic tool-changing system and has a shank portion 2 with a tapered shape and a flange portion 3 forming a forward-protruding extension thereof. The flange portion has an annular flange 4 with a peripheral groove 5 for gripping by the gripper of the tool-changing system. Moreover, the annular flange 4 may conventionally have, at two points located opposite each other, recesses for receiving driver blocks located on the spindle. Moreover, the tool holder 1 is provided with a bore 6 which extends from its front side and which has a cylindrical seat 7 and a threaded portion 8 located behind it. As a result, correspondingly designed tools, cutter arbors, extensions or other work components are securely and precisely held in the main receiving member 1.

A bolt 10 is screwed into a rear-lying bore 9 of the shank portion 2, the mushroom-shaped end 10a of which bolt can be gripped by a collet chuck or the like of a clamping device of known design (not shown) provided inside the main spindle S, in order to pull the tool holder 1 into the receiving bore B in the direction of the arrow F and clamp it inside the bore.

Figure 2:
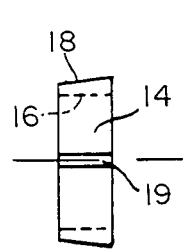
FIGS. 2 and 3 are respective elevational views of the tapered rings of the tool holder of FIG. 1.
Figure 3:
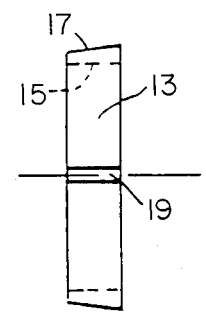

The shank portion 2 has at its front and its rear end a precisely machined guiding surface 11 and 12, respectively, acting as a seat for a cone ring 13 and 14, respectively, which are displaceable thereon (see also FIGS. 2 and 3). Each of these tapered rings has a cylindrical bore 15 or 16 which correspondingly matches the seat 11 or 12, and is provided with a conical external surface 17 or 18.

The angle of inclination of these external surfaces is the same as the angle of inclination of the tapered receiving bore B of the main spindle S. In the embodiment shown, each tapered ring 13 or 14 has a slot, i.e. in each case a continuous longitudinal slot 19 is provided at a point on the circumference (FIGS. 2 and 3).

In the region between the two cylindrical seats 11 and 12, the shank portion 2 has a tapered shape, the external dimensions of this tapered surface 20 being slightly smaller than the internal dimensions of the tapered receiving bore B of the main spindle, while the angle of taper is advantageously the same so that the surfaces of these two parts in this region run concentrically at the same small distance from each other.

The numbers 21 and 22 denote elastic bearings for the two tapered rings 13 ane 14. In the advantageous embodiment shown, these rings are made from elastic material, preferably a suitable plastic. However, other elements, in particular spring arrangements, may be provided. As a variation from the illustration shown in FIG. 1, in place of the radial surfaces 23 and 24 against which the bearings 21 and 22 bear, grooves may also be provided, inside which the bearings are partly accommodated. After being pushed up onto the seats 11, 12, the tapered rings 13 and 14 are prevented from sliding back down by rings 25 or other suitable members placed inside peripheral grooves of the shank portion 2.

If the tool holder 1 is introduced into the receiving bore B of the main spindle, for example by means of a tool-changing system, and is then gripped by a clamping device gripping the head 10a of the bolt 10 and pulled into the receiving bore B, the tapered rings 13 and 14 initially come to bear against the conical surface of the receiving bore B. Since the tapered rings 13 and 14 can be displaced independently of each other on their seats 11 and 12, tolerances in the angle of taper of the surfaces mapped on each other can also be compensated for. It is thus ensured that the tool holder comes to bear without difficulty against the receiving surface of the main spindle. As a result of the tool holder being pulled further into the spindle, the elastic bearings 21 and 22 are compressed by a certain amount or additionally braced, depending on the circumstances, until a flat annular surface 26 on the rear side of the flange portion 3 comes to bear against the front end face 27 of the main spindle S. The elastic force of the bearings 21 and 22 at the same time causes the tapered rings 13, 14 to be firmly pressed against the internal conical surface of the receiving bore B. If a certain small amount of play should be present between a tapered ring 13 or 14 and the associated seat 11 or 12, bracing by the bearings 21, 22 at the same causes constriction of one or both tapered rings 13 or 14, with the result that any play is completely eliminated. However, dimensioning can also be effected such that the tapered ring in question is pushed up onto its seat from the front inwards, so that it is prestressed.

Figure 4:
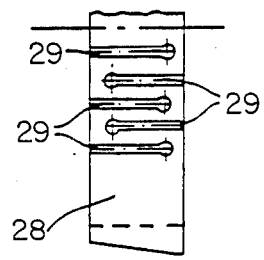
FIG. 4 is a partial elevational view of another embodiment of a tapered ring.

FIG. 4 shows part of a tapered ring 28 which has an alternating sequence of slots 29 extending from both edges of the ring. The number and size as well as the length of these slots can be chosen so that the best possible properties of the tapered ring for the particular application can be achieved. In addition to the arrangements shown, other slot designs, in particular in the form of an "H", are also possible.

Figure 5:
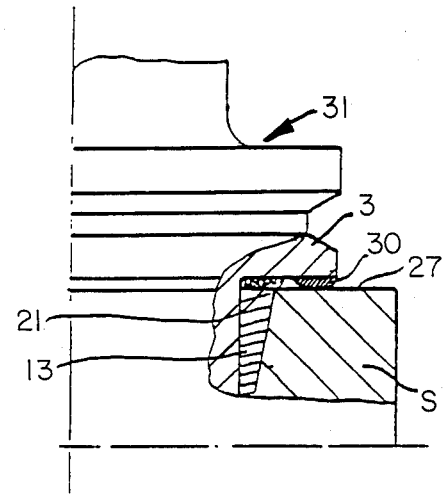
FIG. 5 is an elevational view partially cut away to show in partial cross-section another embodiment of the flange portion of the invention.

FIG. 5 shows an embodiment of a tool holder 31, in which, in contrast to the embodiment according to FIG. 1, there is no direct metal contact between the flange portion 3 and front end face 27 of the main spindle S and instead the bearing pressure is applied via a plastic vibration-damping lining 30 which is fixed to a rear annular surface of the flange portion 3, for example by means of gluing. Moreover, the statements made in connection with FIG. 1 also correspondingly apply here. A taperered ring 13 with its elastic bearing 21 can also be seen in FIG. 5.

Figure 6:
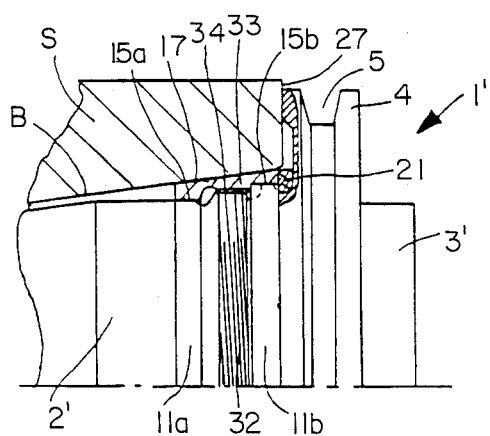
FIG. 6 is a partial cross-sectional view of a further embodiment of a tapered ring and its receiving position.

In the embodiment according to FIG. 6, the same or corresponding parts are indicated with the same reference numbers as in FIG. 1. The tool holder 1' with its shank portion 2' and flange portion 3', which is also shown here in its position inserted into the receiving bore B of a main spindle S, is provided in the front region of the shank portion 2' with an external thread 32 which advantageously has a relatively small pitch. In front of and behind this thread there are two precise cylindrical guiding surfaces 11a and 11b, the guiding surface 11a of which has a smaller external diameter and the guiding surface 11b a larger external diameter than the thread 32.

A tapered ring 33 with a tapered external surface 17 has two cylindrical bores 15a and 15b with different diameters, which are associated with and correspondingly match the guiding surfaces 11a and 11b, respectively and between which an internal thread 34 engaging external thread 32 of the shank portion 2' is provided. In this case also, the tapered ring 33 bears with its end face against an elastic bearing 21 in the form of an O-ring or the like. The conditions are chosen so that, in the state where the tapered ring 33 is screwed onto the thread 32 and in the resultant utilizable range for axial adjustment of the tapered ring 33, the bearing 21 is always subjected to pressure or prestressed. As a result, in addition to the elimination of play achieved and easy adjustment to the given conditions of a certain machine when using the tool holder, the tapered ring 33 is prevented from twisting on the shank portion 2', whenever the tool holder 1' is removed from the spindle after a machining operation and, for example, deposited in a store until used again.

At the rear end of the shank portion 2', a tapered ring with a thread may also be correspondingly or similarly arranged and designed as the front tapered ring shown in FIG. 6. However, it is especially advantageous for a freely displaceable arrangement to be chosen for the rear tapered ring, in particular as described in connection with the rear tapered ring 14 shown in FIG. 1.

All of the features mentioned in the description above or illustrated in the drawing, insofar as permitted by the known state of the art, are regarded as falling within the scope of the invention, either separately or in combination with each other.

I claim:

1. In a tool holder having a shank portion insertable into a conical receiving part of a main spindle of a machine tool for clamping therein, a flange portion forming a front extension of the shank portion, a face on the front portion for bearing against the front face of the main spindle, a cylindrical guide on the front region of the shank portion, a tapered ring on the front portion of the shank portion engageable with the surface of the conical receiving part of the main spindle, and an elastic bearing between the flange portion and the tapered ring, the improvement comprising:
   a rear region on the shank portion within the conical receiving part of the main spindle;
   a second cylindrical guide on said rear region of the shank portion for engagement with the surface of the conical receiving part of the main spindle at a position spaced from the first-mentioned tapered ring; and
   a second elastic bearing between said shank portion and said second tapered ring.

2. The improvement in a tool holder as claimed in claim 1 and further comprising:
   at least one slot extending longitudinally in at least one of said tapered rings.

3. The improvement in a tool holder as claimed in claim 2 wherein:
   said at least one slot comprises a continuous slot extending the entire longitudinal length of said at least one tapered ring.

4. An improved tool holder as claimed in claim 2 wherein:
   said at least one slot comprises a continuous slot in each of said tapered rings extending the full axial length thereof.

5. An improved tool holder as claimed in claim 2 wherein:
   said at least one slot comprises a plurality of slots circumferentially spaced in at least one of said tapered rings extending from one end thereof and over only a part of the axial length thereof.

6. An improvement in a tool holder as claimed in claim 1 and further comprising:
   an external thread on said first-mentioned cylindrical guide; and
   an internal thread on said first-mentioned tapered ring cooperatively engagable with said external thread.

7. An improvement in a tool holder as claimed in claim 6 and further comprising:
   a cylindrical guiding surface on said shank portion on each side of said external thread; and
   internal guiding surfaces on said first-mentioned tapered ring upon each side of said intenal thread correspondingly engageable with said cylindrical guiding surfaces.

8. An improvement in a tool holder as claimed in claim 1 and further comprising:
   a vibration-damping lining on at least part of the rear side of said flange portion engageable with the front end face of the main spindle.

9. An improvement in a tool holder as claimed in claim 8 wherein:
   said vibration-damping lining comprises plastic material.

* * * * *

UNITED STATES PATENT AND TRADEMARK OFFICE
CERTIFICATE OF CORRECTION

PATENT NO. : 4,714,389
DATED : December 22, 1987
INVENTOR(S) : Frank Johne

It is certified that error appears in the above-identified patent and that said Letters Patent is hereby corrected as shown below:

On the title page assignee should read

--(73)Assignee: J. Kuhn GmbH & Co., Prazisionswerkzeug KG --.

Signed and Sealed this

Thirteenth Day of September, 1988

*Attest:*

DONALD J. QUIGG

*Attesting Officer*  *Commissioner of Patents and Trademarks*